US011803699B1

(12) United States Patent
Papageorgiou

(10) Patent No.: US 11,803,699 B1
(45) Date of Patent: Oct. 31, 2023

(54) ANNOTATING A MESSAGE BODY WITH TIME EXPRESSIONS

(71) Applicant: International Business Machines Corporation, Armonk, NY (US)

(72) Inventor: Anthony Philip Papageorgiou, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/807,767

(22) Filed: Jun. 20, 2022

(51) Int. Cl.
*G06F 17/00* (2019.01)
*G06F 40/169* (2020.01)
*H04L 51/222* (2022.01)
*G06F 40/205* (2020.01)

(52) U.S. Cl.
CPC .......... *G06F 40/169* (2020.01); *G06F 40/205* (2020.01); *H04L 51/222* (2022.05)

(58) Field of Classification Search
CPC ..... G06F 40/169; G06F 40/205; H04L 51/222
USPC ......................................................... 715/231
See application file for complete search history.

(56) References Cited

U.S. PATENT DOCUMENTS

| | | | |
|---|---|---|---|
| 9,529,787 B2 | 12/2016 | Quast | |
| 2003/0167180 A1* | 9/2003 | Chung | G06Q 10/10 705/317 |
| 2005/0114768 A1* | 5/2005 | Atkin | H04L 51/04 715/205 |
| 2008/0153474 A1* | 6/2008 | Scott | H04M 1/2745 455/418 |
| 2010/0228753 A1* | 9/2010 | Jain | G06F 40/295 707/E17.014 |
| 2011/0106892 A1 | 5/2011 | Nelson | |
| 2011/0161445 A1* | 6/2011 | Nelke | H04L 51/04 709/206 |

(Continued)

FOREIGN PATENT DOCUMENTS

CN 106533908 A 3/2017

OTHER PUBLICATIONS

Ranganathan, ConChat: A Context-Aware Chat Program, Context Aware Computing, IEEE, published 2002 (Year: 2002).*

(Continued)

*Primary Examiner* — Stephen S Hong
*Assistant Examiner* — Matthew J Ludwig
(74) *Attorney, Agent, or Firm* — Stephen R. Yoder

(57) ABSTRACT

A computer-implemented method, computer program product and system for annotating messages with a parsed time expressions is provided. A processor detects a time expression in a message. A processor establishes a time zone associated with the time expression, based upon the message body, the sending client's real-time location and the sending client's pre-determined time zone settings. A processor establishes a time zone of the receiving client based upon the receiving client's real-time location and the receiving client's pre-determined time zone settings. A processor compares the time zone of the time expression and the time zone of the receiving client to determine whether a parsing of the time expression in the message is required. A processor creates an annotation of the time expression based on the comparison of the time zones of the sending client and the receiving client. A processor appends the annotation of the time expression to the message.

17 Claims, 6 Drawing Sheets

(56) References Cited

U.S. PATENT DOCUMENTS

| | | | | |
|---|---|---|---|---|
| 2012/0197969 A1* | 8/2012 | Poon | ............... | H04L 12/6418 |
| | | | | 709/203 |
| 2012/0262532 A1* | 10/2012 | Poon | ............... | H04N 7/15 |
| | | | | 348/14.02 |
| 2013/0007142 A1* | 1/2013 | Rosenberg | ............... | G06Q 10/107 |
| | | | | 709/206 |
| 2013/0173464 A1* | 7/2013 | Quillian | ............... | G06Q 40/02 |
| | | | | 705/40 |
| 2014/0149560 A1* | 5/2014 | Hakami | ............... | H04L 67/565 |
| | | | | 709/221 |
| 2014/0297762 A1* | 10/2014 | Chikkanna | ............... | H04L 51/222 |
| | | | | 709/206 |
| 2015/0112769 A1* | 4/2015 | Collins | ............... | G06Q 10/0637 |
| | | | | 705/7.36 |
| 2015/0149561 A1* | 5/2015 | Bell | ............... | H04L 51/046 |
| | | | | 709/206 |
| 2017/0180283 A1* | 6/2017 | Bell | ............... | H04L 51/04 |
| 2017/0193083 A1 | 7/2017 | Bhatt | | |
| 2018/0097752 A1 | 4/2018 | Yates | | |
| 2018/0196797 A1* | 7/2018 | Mansour | ............... | G06F 40/226 |
| 2020/0302264 A1 | 9/2020 | Fourney | | |
| 2023/0129808 A1* | 4/2023 | Yu | ............... | G06N 3/08 |
| | | | | 709/206 |

OTHER PUBLICATIONS

"How to use Sender's Time Zone for Outlook", accessed on May 25, 2022, 3 pages, <https://www.ablebits.com/docs/outlook-senders-timezone/>.

Thakur, Tushar, "Solutions: Gmail retired the sender's time zone from Labs—alternatives", Xtendedview, Dec. 30, 2020, 7 pages, <https://xtendedview.com/google/senders-time-zone-from-labs/1636/>.

* cited by examiner

ANNOTATING A MESSAGE BODY WITH TIME EXPRESSIONS

BACKGROUND

The present invention relates to messaging technology, and more particularly to a method and a computer program product for annotating a message body with a parsed time expression.

The use of messaging devices for communication has become universal among customers for business and personal purposes. Messaging devices, such as mobile phones, tablets and laptops are used by users to communicate to other users around the globe, where the sender and recipient are often located in different time zones.

Messaging communications are pertinent in the modern business working environments, where it is common for international colleagues to be working together via online communication platforms. Scheduling meetings and events that are synchronized across all time-zones are essential.

SUMMARY

A first aspect is provided for a method computer program product, and computer system for annotating a message with a parsed time expression comprising: detecting a time expression in a message, wherein the message is sent from a sending client to a receiving client; establishing a time zone associated with the time expression, the sending client's real-time location and the sending client's pre-determined time zone settings; establishing a time zone of the receiving client based upon the receiving client's real-time location and the receiving client's pre-determined time zone settings; comparing the time zone of the time expression and the time zone of the receiving client to determine whether a parsing of the time expression in the message is required; in response to determining that a parsing is required, creating an annotation of the time expression based on the comparison of the time zones of the sending client and the receiving client; and appending the annotation of the time expression to the message.

The annotation allows the sender and the receiver to fully understand the context of the time expression. This is done automatically, without the users needing to look up all the time-zones and manually converting the time expression. This may apply to group conversations with multiple time-zones and multiple participants.

Some embodiments of the present invention provide a method, wherein the receiving client is one of a plurality of recipients of the message.

Some embodiments of the present invention provide a method, further comprising transmitting the appended message to the receiving client. Transmitting the appended message to the receiving client allows the receiving user to understand the time expression that the sender has sent.

Some embodiments of the present invention provide a method, wherein the method is processed by a server, wherein the server is in communication with the sending client and the receiving client. Processing the method at the server allows for the conversion of the time expression to be done centrally, and the resulting annotation is transmitted to each client. This method can save processing resources, especially if there are many participants in a chat group.

Some embodiments of the present invention provide a method, wherein the method is processed by the receiving client. Processing the method on the client side allows for each receiving client not to rely on the server, or the other receiving clients, to carry out the parsing of the time expression. This can be a faster way of carrying out the method, especially if the annotation only contains information about the specific user's time-zone and not of the others' time-zones.

Some embodiments of the present invention provide a method, wherein the method is processed by the sending client. The sending client may create annotations before the message is sent to the messaging server.

Some embodiments of the present invention provide a method, wherein the creating an annotation of the time expression of the message depends on the predetermined annotation settings of the receiving client. Annotation settings allow each receiving client to customize how they consume the annotation. For example, one user may only want an annotation with information related to themselves. Alternatively, for example, another user may want an annotation that includes all other time-zone information about the other participants in the chat group.

Some embodiments of the present invention provide a method, wherein the receiving client appends the annotation after receiving the transmitted message.

Some embodiments of the present invention provide a method, wherein the annotation of the time expression of the message is a string, which is appended in line with the message body of the message. An in-line text-based annotation may be a cost-effective way to display the annotation within the message body, without the need for additional software components.

Some embodiments of the present invention provide a method, wherein the annotation of the time expression of the message is embedded into an interactive graphical user interface feature. Displaying the annotation through an interactive graphical user interface allows for the user to view the annotation in a variety of ways that can be personalized and customized. The interactive nature allows for the annotation to be embedded or hidden within the message body, such that the annotation does not interrupt the original message body. This may also apply where the annotation contains a large amount of information.

DETAILED DESCRIPTION

Conventional shared calendar systems partially alleviate the scheduling problem by automatically synchronizing calendars so that a user can find a suitable time for all participants. There continues to be a problem with using messaging systems to express time. Often, messaging systems are used to agree upon a time and date of an event before the formal calendar invitation is sent out on a shared calendar system.

Communications on messaging systems, which are used on messaging devices, are often casual in nature and mimic the natural flow of a real conversation. For example, a user may write "Is 5 PM OK?" without realizing the recipient is in a different time zone; they have omitted to add any context around the time entirely. Even if the user adds in some additional information, such as "Is 5 PM my time, OK?", communication on messaging system frequently include colloquial language to express time, which cannot be easily interpreted by a calendar system.

In addition, the user may be communicating in a group chat environment, where there may be multiple recipients in different time zones. It is currently difficult for the user to easily communicate a time expression in a messaging system, where there are multiple recipients in different time zones.

Current methods of alleviating this problem include alerting the user that the recipients are in a different time zone, and presenting additional information, such as "Local time for User B is 4 AM". This solution only partially solves the issue of having multiple recipients in different time zones, as they will still need to add time zone information consciously and manually to their message. The user will need to manually convert the time to each recipient's time zone, for example "5 PM for User B, 7 PM for User C". Alternatively, the user can add time zone information to the time expression, for example "5 PM GMT", but this leaves the conversion down to each recipient to calculate the corresponding time in their time zone.

Time expressions are phrases and terms used to convey a time, date, day of the week or year. Time expressions can be structured, for example, "05:00 GMT, Jan. 1, 2022". They can also use verbose or colloquial language, for example, "this evening". In messaging communications, a mix of structured and colloquial are often used together, such as "5 PM my time". It will be appreciated that there may be multiple time expressions in a single message sent, for example, there are two time expressions in the message: "Hi, lets chat at 1 PM, and schedule the team meeting at 17:00 your time".

Figure 1:
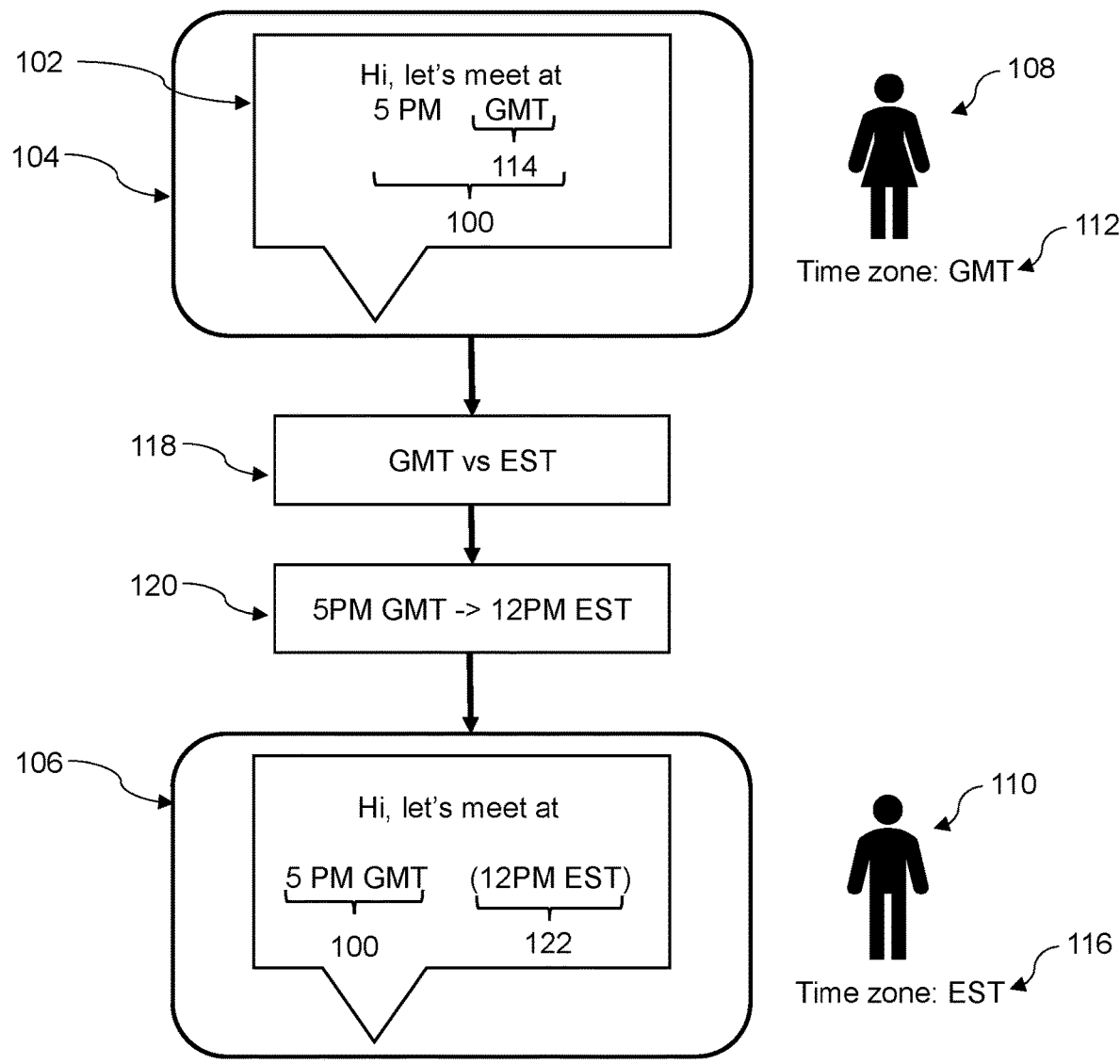
FIG. 1 illustrates an embodiment wherein a message is sent from a sending client to a receiving client.

FIG. 1 illustrates an exemplary embodiment of the method and the computer program product for annotating a message body with a parsed time expression. The method detects a time expression 100 in a message 102, wherein the message 102 is sent from a sending client 104 to a receiving client 106. The sending client 104 is the messaging device used by the sending user 108, and the receiving client 106 is the messaging device used by the receiving user 110.

The method establishes a time zone 114 associated with the time expression 100, based upon the message body of the message 102 or the sending client's 104 real-time location 112, or the sending client's pre-determined time zone settings.

The time expression 100 may already contain time zone information, such as "GMT" 114. If this is this example, the time zone of the time expression can be directly extracted from the message body that the user has typed in.

Alternatively, if no time zone information is given in the message body, for example, if the sending user 108 types in "5 PM", the sending user's 108 real-time location 112 can be used to determine what time zone they meant. For example, if the sending user is located in London as they type the message, it can be established that they are working in the GMT time zone. Therefore, the time zone for the time expression can be set to GMT. The real time location 114 can be determined by using the messaging device's in-built Global Positioning System (GPS) software and hardware.

Alternatively, the sending user 108 can set a pre-determined time-zone to accompany their time expressions. In this way, for example, if the sending user is working in London but the rest of their team works in New York, they can pre-set their time zone to EST, since when they type "5 PM" the sending user usually means 5 PM EST.

The method also establishes a time zone 116 of the receiving client 104 based upon the receiving client's real-time location and the receiving client's pre-determined time zone settings.

Similarly, establishing the sending user's time zone, the GPS of the receiving user's messaging device can be used to determine their real-time location. Alternatively, the receiving user may pre-set a time zone that they want the time zones to be interpreted into.

The method compares 118 the time zone of the time expression 114 and the time zone of the receiving client 116 to determine whether a parsing of the time expression in the message is required.

If a parsing is not required, the message is sent without amendment to the receiving client. If a parsing is required, the method creates 120 an annotation 122 of the time expression based on the comparison of the time zones of the sending client and the receiving client.

The annotation 122 of the parsed time expression is finally appended to the message body of the message 124, wherein the amended message is opened by the receiving client 106.

Figure 2A:
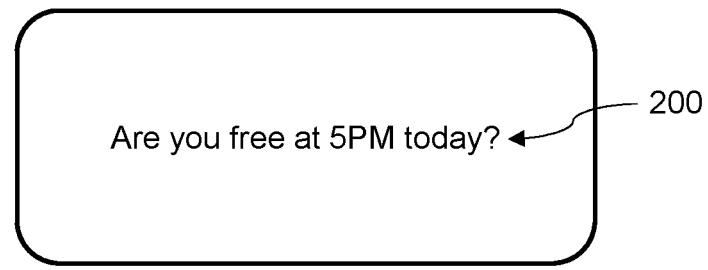
FIGS. 2A-2C illustrate examples of annotations that can accompany a message body.
Figure 2B:
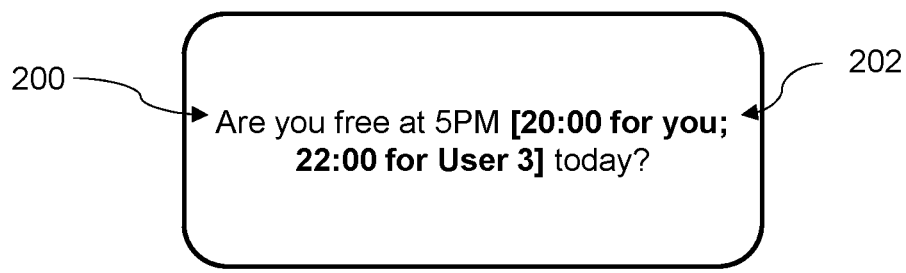
Figure 2C:
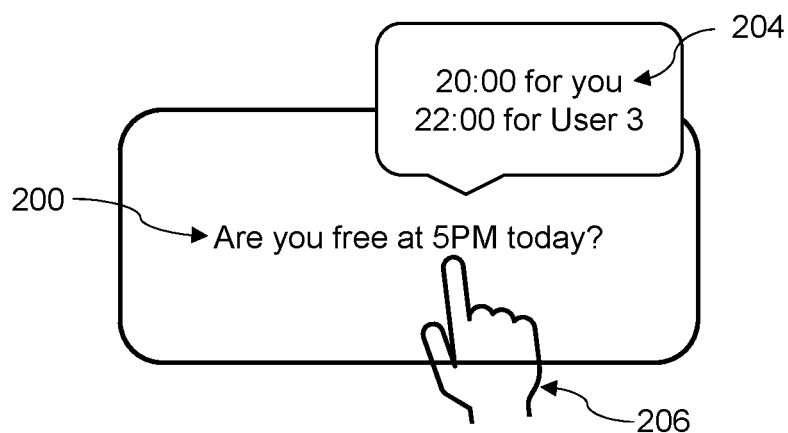

FIG. 2A-C illustrates how the time zone annotations can be appended and rendered on the receiving client's messaging device. FIG. 2A is an example of the original message 200. FIG. 2B is an example of an annotation 202 that is text-based and is appended in line to the original message. FIG. 2C embeds the annotation 204 to the time expression in the original message 200, such that a receiving user can interact 206 with the time expression to reveal the annotation. This can be done by clicking on or hovering over the time expression.

Figure 3:
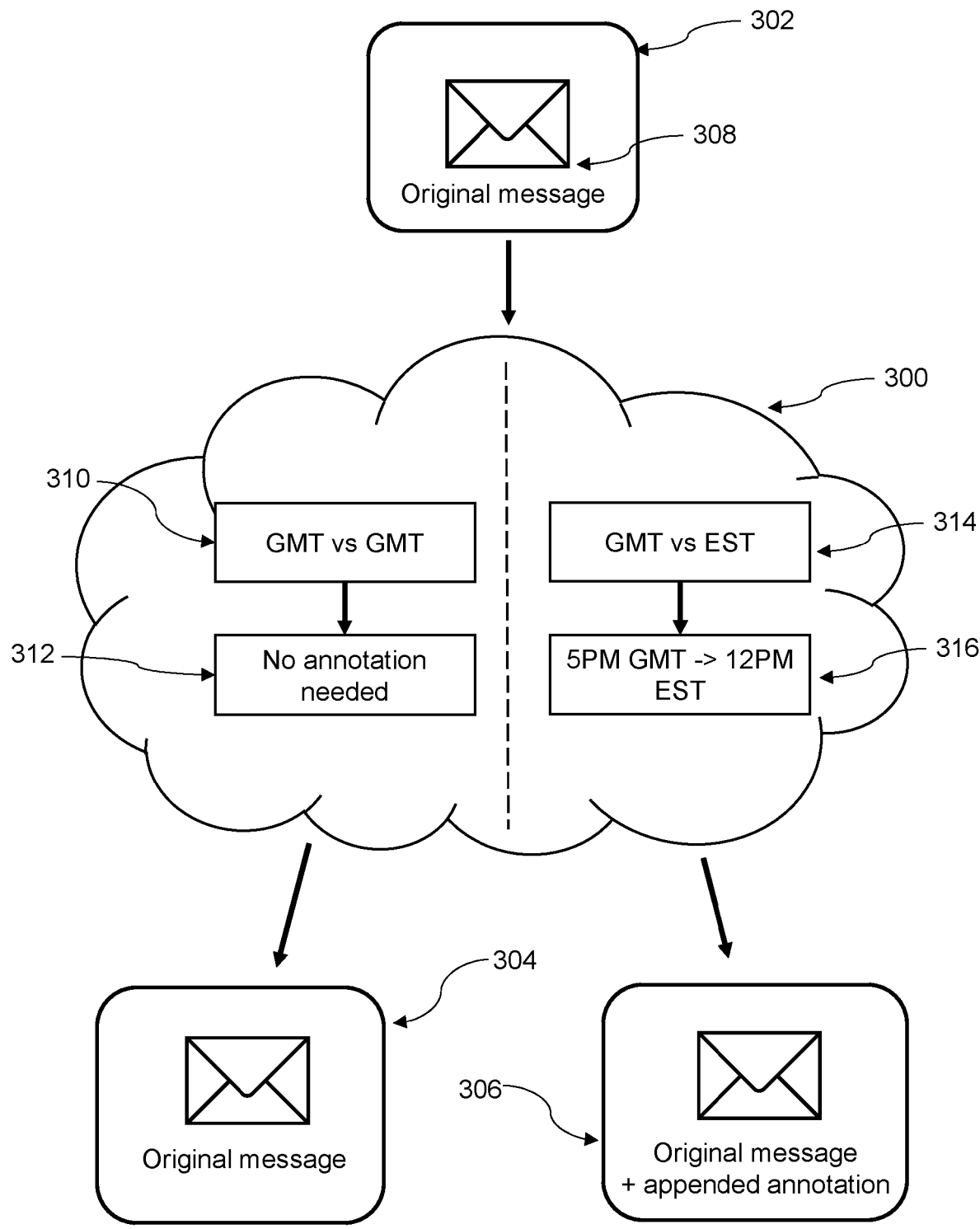
FIG. 3 illustrates an embodiment wherein a message is sent from a sending client to two receiving clients, and wherein the processing is done on a server.

There are different configurations that the method can be implemented into a communications system. FIG. 3 illustrates an embodiment of a configuration where the comparing of the time zones and the creation of the annotation is processed by a server 300, wherein the server 300 is in communication with both the sending client 302 and the receiving clients 304, 406. In this embodiment, there are two receiving clients of the message; a first receiving client 304 that shares the time zone as the time expression, and a second receiving client 306 that does not share the time zone as the time expression.

Once a message is sent to the server 300, the server analyses the message body 308 and requests location information and pre-determined time zone information from the sending client 302 to establish the time zone associated with the time expression in the message. It also requests location information and pre-determined time zone settings to establish the time zone of each of the receiving clients 304, 306.

The server 300 compares the time zone of the time expression and the time zone of the first receiving client 304 to determine whether a parsing of the time expression in the message is required. Comparing 310 the time zone (e.g., "GMT") of the time expression (e.g., "5 PM GMT") with the time zone of the first receiving client (e.g., "GMT"), it is determined 312 that a parsing of time expressions is not required. Therefore, the message is not amended, and the server transmits the original message body of the message to the receiving client.

Comparing 314 the time zone (e.g., "GMT") of the time expression (e.g., "5 PM GMT") with the time zone of the second receiving client 306 (e.g., "EST"), it is determined that a parsing of time expressions is required. As a result, an annotation is created 316, wherein the time expression is parsed into the time zone of the receiving client. Finally, the server transmits the amended message body of the message to the receiving client.

An alternative embodiment of the present invention creates an annotation for a receiving client if another member of the group requires a parsing of the time expression. For example, referring to FIG. 3, it is established that receiving client 1 304 does not require a parsing of the time zone since both the sending client 302 and the first receiving client 304 are in the same "GMT" time zone. Instead of sending the original message without any annotations, since the server determines that the second receiving client 306 does require a parsing of the time zone, the present invention creates an annotation for the first receiving client 304 to reflect this.

For example, if the original message was "5 PM my time", the annotation for the first receiving client 304 can be "5 PM my time [[5 PM for you, 12 PM for receiving client 2]]. This annotation includes time zone information about all receiving clients in the group chat. Alternatively, the annotation can be "5 PM my time [[12 PM for receiving client 2]]. This annotation only includes time zone information about the receiving clients in the group chat that require a parsing of time zone. These different styles of annotation can be set by pre-determined user settings of the receiving clients, or by the messaging platform. The user settings may also include formatting and styling options.

Figure 4:
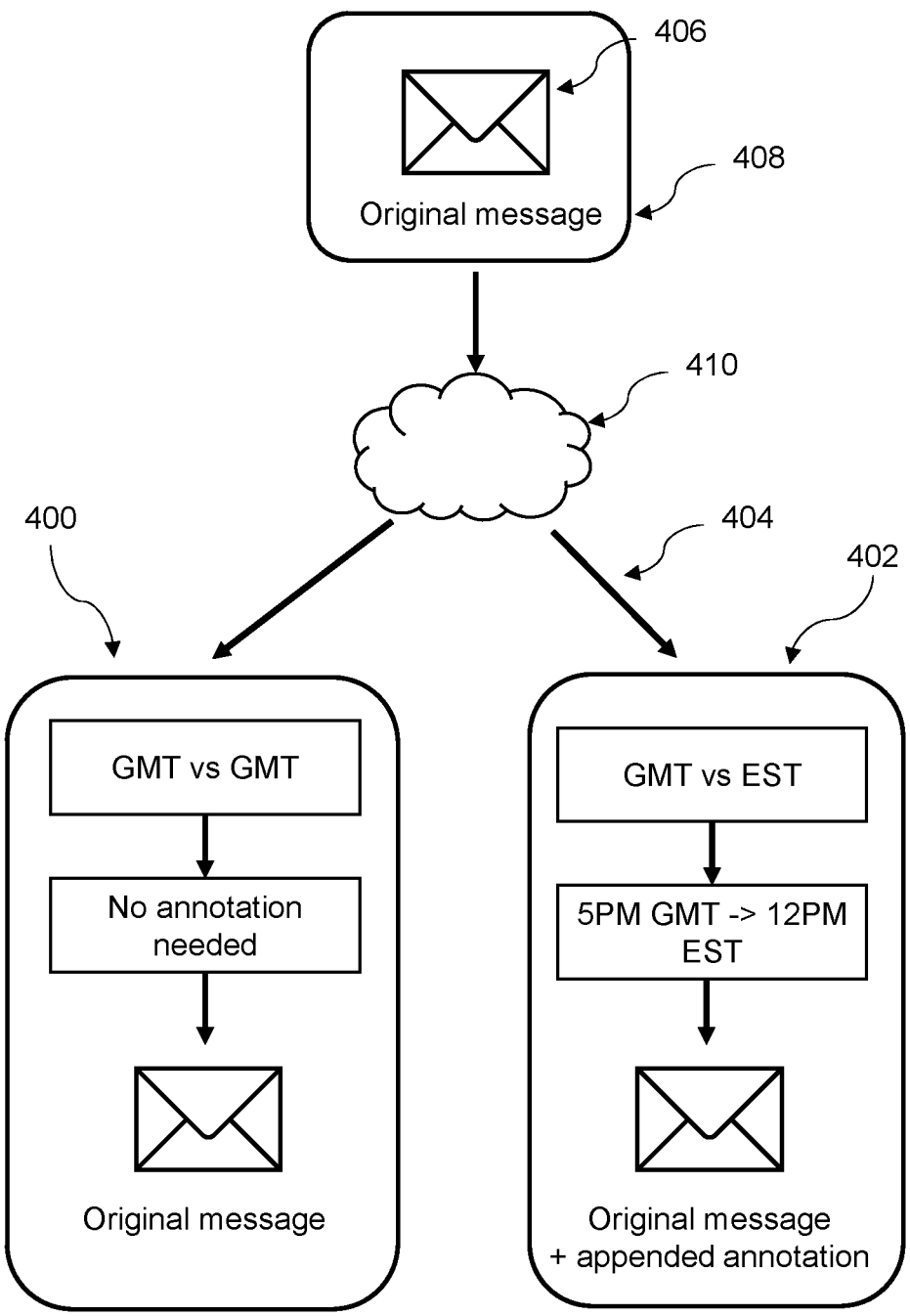
FIG. 4 illustrates an embodiment wherein a message is sent from a sending client to two receiving clients, and wherein the processing is done on each receiving client.

FIG. 4 illustrates an embodiment of a configuration where the comparing of the time zones and the creation of the annotation is processed by each receiving client 400, 402 that receives the message. In this configuration, the transmission of the message 404 occurs before the comparison of the time zones and the creation of the annotation, which are done by each receiving client. In this embodiment, there are two receiving clients 400, 402 of the message 406; a first receiving client 400 that shares the time zone as the time expression, and a second client 402 that does not share the time zone as the time expression.

A message is sent from the sending client 408 to a server 410. The server 410 transmits the message to each receiving client 400, 402. Each client analyses the message body for time expressions, requests information about the sending client's location and the sending client's time zone settings to establish a time zone for the time expression. The first receiving client 400 determines that a parsing of the time expression is not required and therefore displays the original message body to the receiving user. The second receiving client 402 determines that a parsing of the time expression is required and therefore creates an annotation, wherein the time expression is parsed into the time zone of the receiving client 402. The second receiving client 402 finally displays the original message body with the appended annotation to the receiving device.

Figure 5:
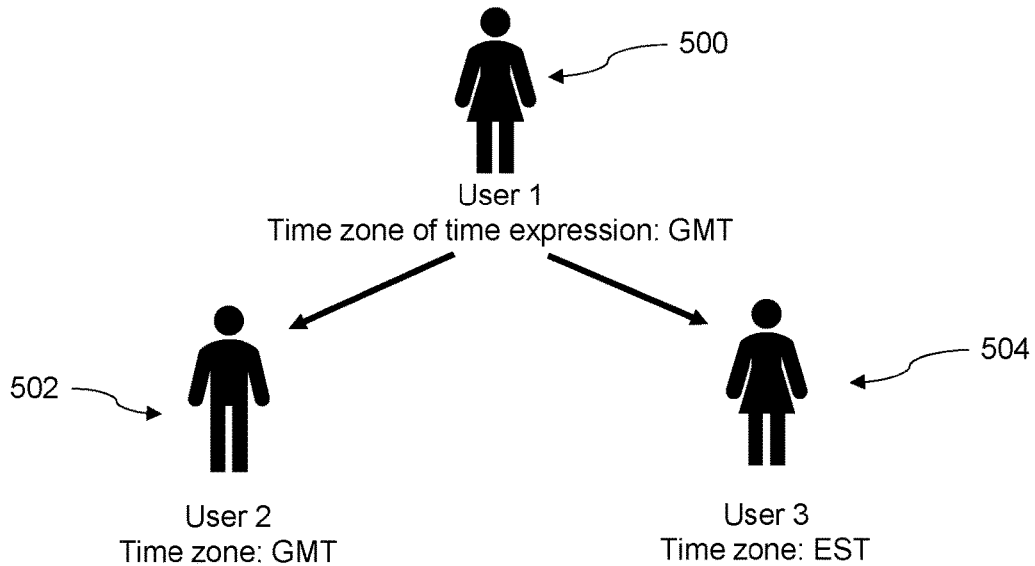
FIG. 5 illustrates an embodiment wherein a message is sent from a sending client to two receiving clients.

The pre-determined time zone settings allow both sending and receiving users to set their working location. FIG. 5 illustrates a message being sent from a User 1 500 to two receiving clients, User 2 502, and User 3 504. The time zone of the time expression (GMT) is the same as the time zone of User 2 (GMT). Therefore, the message does not require parsing and the original message is transmitted to User 2 502. The time zone of the time expression (GMT) is different to the time zone of User 3 504 (EST). Therefore, an annotation is created and appended to the message received by User 3.

Figure 6:
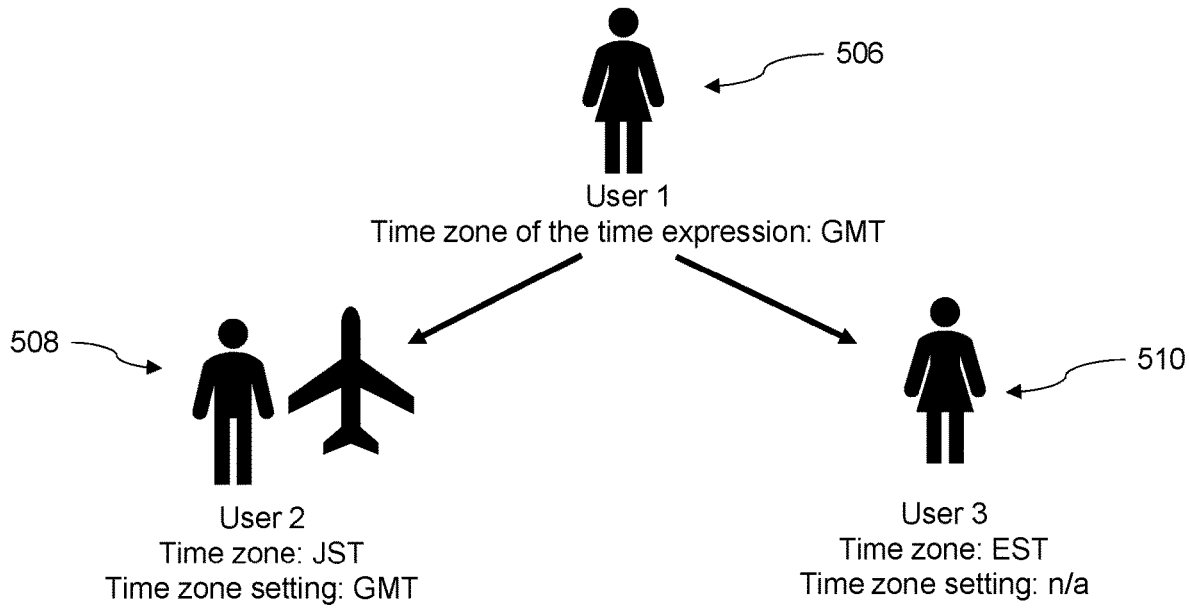
FIG. 6 illustrates an embodiment wherein a message is sent from a sending client to two receiving clients and wherein the users have pre-defined time zone settings.

FIG. 6 illustrates a message being sent from a User 1 506 to two receiving clients, User 2 508, and User 3 510. This time, User 2 508 is travelling temporarily and is physically in Japan as Users 1, 2 and 3 are communicating in a group chat. Although the real-time time zone of User 2 508 (JPN) is different to the time zone of the time expression of the message (GMT), User 2 508 has set a pre-determined time zone setting to be GMT. Therefore, the message from User 1 506 is not amended when it is received by User 2 508. This feature is useful when a user is travelling while sending or receiving messages. Alternatively, for example, a user may be a remote worker in London, working for an American company based in New York and working in EST. Therefore, the remote worker may want to assume that all references to time in communications with their colleagues are in EST, not GMT.

If there are multiple time expressions in the message, each time expression is parsed into the time zone of the recipient. Therefore, the final received message will have multiple attached annotations to the message. For example, a final received message may be "Hi, lets chat at 1 PM [[5 PM for you]], and schedule the team meeting at 17:00 your time [[9 PM for you]]".

An alternative embodiment of the present invention compares the time zone of the time expression of a message with the receiving clients' time zones before the message is sent via the server. Before the message is sent, the server has information about the users in a group chat, including their respective time zones. This allows the comparison of the time zones of the time expression with the receiving clients' time zones to be processed as the sending client types their message. The calculated annotation can be appended to the message as the it is being written by the sending client. For example, the receiving client can be prompted with an annotation such as "Hi, let's meet at 5 PM your time [[5 PM for User 1, 10 PM for User 2.]]".

Figure 7:
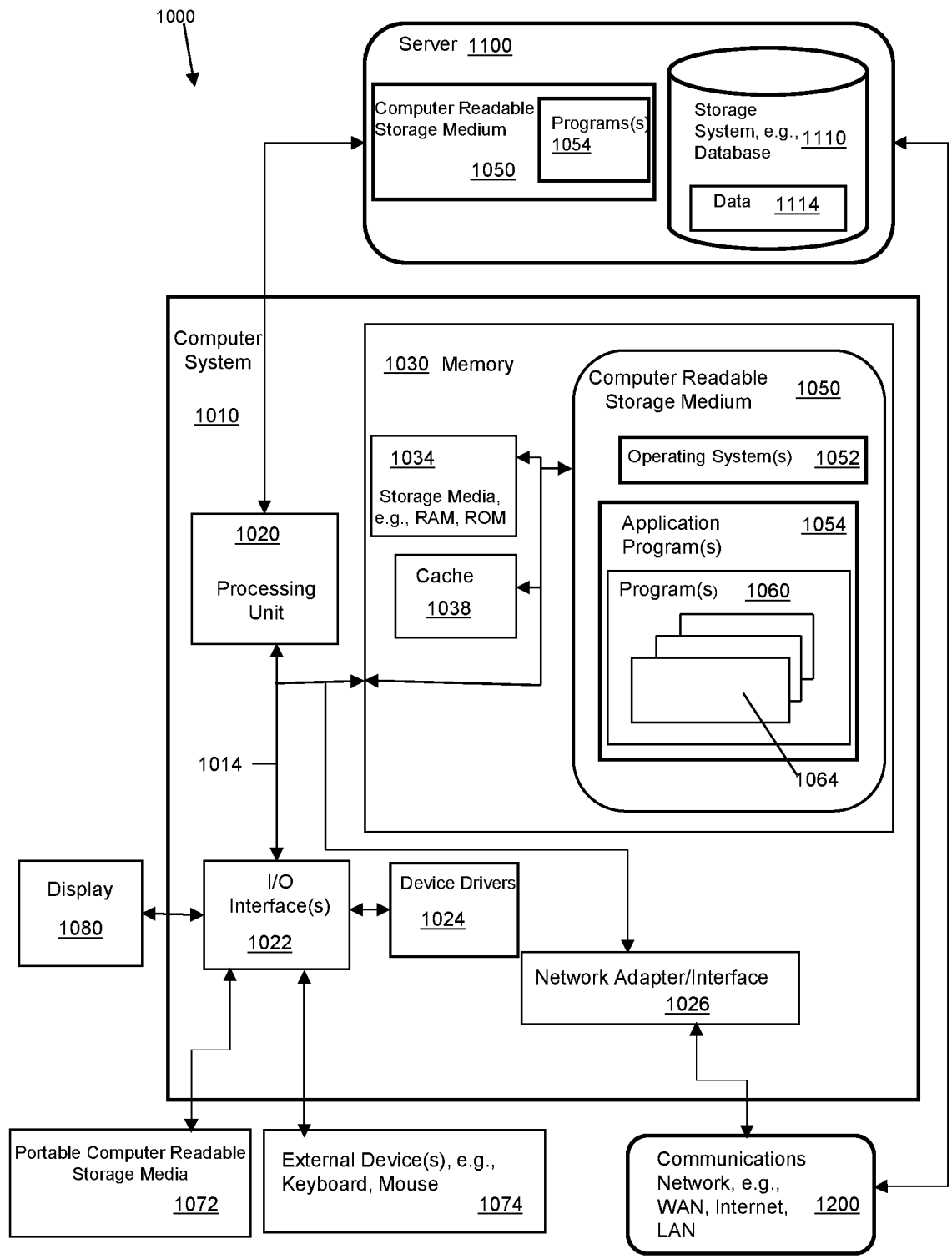
FIG. 7 is a block diagram depicting the hardware components of a system, for operating a gyroscopic haptic navigation device in accordance with an embodiment of the invention.

The messaging devices and the server may include internal and external hardware components, as described in further detail below with respect to FIG. 7. It should be appreciated that FIG. 7 provides only an illustration of one implementation and does not imply any limitations with regard to the environments in which different embodiments may be implemented. Many modifications to the depicted environment may be made.

Referring to FIG. 7, a system 1000 includes a computer system or computer 1010 shown in the form of a generic computing device. The method of the present invention, for example, may be embodied in a program(s) 1060 embodied on a computer readable storage device, for example, generally referred to as memory 1030 and more specifically, computer readable storage medium 1050. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 7 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 7 as program modules 1064. The program 1060 and program modules 1064 can execute specific steps, routines, sub-routines, instructions or code, of the program.

Embodiments of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 7, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method of the present invention, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The program 1060 may be the keyword system 104 or the natural language processing system 106. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    detecting a time expression in a message, wherein the message is sent from a sending client to a receiving client;
    in response to determining that a parsing of the time expression is required, creating an annotation of the time expression based on the comparison of time zones of the sending client and the receiving client, wherein (i) the annotation includes both the time expression and a converted time expression in regards to the receiving client and (ii) the annotation of the time expression of the message is a string, which is appended in line with the message body of the message;
    appending the annotation of the time expression to the message; and
    sending the message to the receiving client, wherein (i) the message includes the annotation of the time expression and (ii) the receiving client replaces the annotation with the converted time expression.

2. The computer-implemented method of claim 1, the computer-implemented method further comprising:
    establishing a time zone associated with the time expression, the sending client's real-time location and the sending client's pre-determined time zone settings.

3. The computer-implemented method of claim 2, the computer-implemented method further comprising:
    establishing a time zone of the receiving client based upon the receiving client's real-time location and the receiving client's pre-determined time zone settings.

4. The computer-implemented method of claim 1, wherein the creating an annotation of the time expression of the message depends on the predetermined annotation settings of the receiving client.

5. The computer-implemented method of claim 1, wherein the receiving client appends the annotation after receiving the transmitted message.

6. The computer-implemented method of claim 1, wherein the annotation of the time expression of the message is embedded into an interactive graphical user interface feature.

7. A computer program product comprising:
    one or more computer-readable storage media and program instructions stored on the one or more computer-readable storage media, the program instructions comprising:
        program instructions to detect a time expression in a message, wherein the message is sent from a sending client to a receiving client, wherein (i) the annotation includes both the time expression and a converted time expression in regards to the receiving client and (ii) the annotation of the time expression of the message is a string, which is appended in line with the message body of the message;
        program instructions, in response to determining that a parsing of the time expression is required, to create an annotation of the time expression based on the comparison of time zones of the sending client and the receiving client;
        program instructions to append the annotation of the time expression to the message; and
        program instructions to send the message to the receiving client, wherein (i) the message includes the annotation of the time expression and (ii) the receiving client replaces the annotation with the converted time expression.

8. The computer program product of claim 7, the program instructions further comprising:
    program instructions to establish a time zone associated with the time expression, the sending client's real-time location and the sending client's pre-determined time zone settings.

9. The computer program product of claim 8, the program instructions further comprising:
    program instructions to establish a time zone of the receiving client based upon the receiving client's real-time location and the receiving client's pre-determined time zone settings.

10. The computer program product of claim 7, wherein the creating an annotation of the time expression of the message depends on the predetermined annotation settings of the receiving client.

11. The computer program product of claim 7, wherein the receiving client appends the annotation after receiving the transmitted message.

12. The computer program product of claim 7, wherein the annotation of the time expression of the message is embedded into an interactive graphical user interface feature.

13. A computer system comprising:
    one or more computer processors;
    one or more computer readable storage media; and
    program instructions stored on the computer readable storage media for execution by at least one of the one or more processors, the program instructions comprising:
        program instructions to detect a time expression in a message, wherein the message is sent from a sending client to a receiving client, wherein (i) the annotation includes both the time expression and a converted time expression in regards to the receiving client and (ii) the annotation of the time expression of the message is a string, which is appended in line with the message body of the message;
        program instructions, in response to determining that a parsing of the time expression is required, to create an annotation of the time expression based on the comparison of time zones of the sending client and the receiving client;

program instructions to append the annotation of the time expression to the message; and program instructions to send the message to the receiving client, wherein (i) the message includes the annotation of the time expression and (ii) the receiving client replaces the annotation with the converted time expression.

14. The computer system of claim 13, the program instructions further comprising:

program instructions to establish a time zone associated with the time expression, the sending client's real-time location and the sending client's pre-determined time zone settings.

15. The computer system of claim 14, the program instructions further comprising:

program instructions to establish a time zone of the receiving client based upon the receiving client's real-time location and the receiving client's pre-determined time zone settings.

16. The computer system of claim 13, wherein the receiving client appends the annotation after receiving the transmitted message.

17. The computer system of claim 13, wherein the annotation of the time expression of the message is a string, which is appended in line with the message body of the message.

* * * * *